United States Patent
Lee (10) Patent No.: US 10,019,358 B2
(45) Date of Patent: Jul. 10, 2018

(54) BANK ADDRESS REMAPPING TO LOAD BALANCE MEMORY TRAFFIC AMONG BANKS OF MEMORY

(71) Applicant: VIXS Systems Inc., Toronto (CA)

(72) Inventor: Brian Lee, Markham (CA)

(73) Assignee: VIXS SYSTEMS INC., Toronto (CA)

( * ) Notice: Subject to any disclaimer, the term of this patent is extended or adjusted under 35 U.S.C. 154(b) by 0 days.

(21) Appl. No.: 14/802,236

(22) Filed: Jul. 17, 2015

(65) Prior Publication Data

US 2016/0276002 A1    Sep. 22, 2016

Related U.S. Application Data

(60) Provisional application No. 62/135,831, filed on Mar. 20, 2015.

(51) Int. Cl.
| | |
|---|---|
| *G06F 12/00* | (2006.01) |
| *G06F 12/06* | (2006.01) |
| *G06F 13/16* | (2006.01) |

(52) U.S. Cl.
CPC .......... *G06F 12/0607* (2013.01); *G06F 12/06* (2013.01); *G06F 13/1642* (2013.01); *G06F 13/1647* (2013.01)

(58) Field of Classification Search
None
See application file for complete search history.

(56) References Cited

U.S. PATENT DOCUMENTS

| | | | | |
|---|---|---|---|---|
| 2010/0262751 | A1* | 10/2010 | Avudaiyappan | G06F 12/0292 711/5 |
| 2010/0274960 | A1* | 10/2010 | Lee | G06F 12/0607 711/106 |
| 2010/0306499 | A1* | 12/2010 | Petolino, Jr. | G06F 12/1027 711/207 |
| 2011/0252180 | A1* | 10/2011 | Hendry | G06F 1/3203 711/3 |
| 2013/0097403 | A1* | 4/2013 | Zheng | G06F 12/1036 711/206 |

\* cited by examiner

*Primary Examiner* — Daniel D Tsui
(74) *Attorney, Agent, or Firm* — Marger Johnson (57) ABSTRACT

A system includes a processing component and a memory controller. The memory controller is to conduct memory accesses to a banked memory responsive to memory access requests from the processing component, whereby the memory controller is to distribute memory accesses among the plurality of banks by modifying, for each memory access request, a bank of the bank memory referenced by the memory access request. A memory device includes a plurality of banks, an interface to receive memory access requests, bank remapping logic, and access control logic. The bank remapping logic is to, for each received memory access request, remap a bank segment of a memory address associated with the received memory access request with a modified bank segment. The access control logic is to, for each received memory access request, access a bank of the plurality of banks based on the modified bank segment for the memory access request.

14 Claims, 6 Drawing Sheets

BANK ADDRESS REMAPPING TO LOAD BALANCE MEMORY TRAFFIC AMONG BANKS OF MEMORY

CROSS-REFERENCE TO RELATED APPLICATIONS

The present application claims priority to U.S. patent application Ser. No. 62/135,831, entitled "BANK ADDRESS REMAPPING TO LOAD BALANCE MEMORY TRAFFIC AMONG BANKS OF MEMORY" and filed on Mar. 20, 2015, the entirety of which is incorporated by reference herein.

FIELD OF THE DISCLOSURE

The present disclosure generally relates to memory systems and more particularly to address mapping in banked memory systems.

BACKGROUND

Memory systems often provide a non-uniform access latency to different memory addresses depending on the memory regions previously accessed. In banked memory systems, such as those based on a dynamic random access memory (DRAM) architecture, accesses to recently accessed regions of memory ("active pages") will have a lower latency than accesses to other pages. To illustrate, a Double Data Rate 3 (DDR3) DRAM supports lower latency access to up to eight pages of memory and accesses to other pages will incur penalties. There are restrictions in how these eight pages are organized; in DDR3, the entire array is divided into eight "banks", and each bank can have one active page.

Many processing systems implement functions using an embedded operating system (such as Linux) or firmware. In both of these environments, software functions allocate memory from a free memory heap. The implementation of these functions often creates buffers aligned to 2" boundaries. The combination of this memory allocation process and the intrinsic nature of DRAMs and other banked memories typically causes an imbalance of in the amount of traffic targeting the lower banks, and particularly for the lowest numbered bank (that is, the "first" bank). This introduces significant inefficiencies in that as more traffic is routed to a bank, it becomes more likely that the accesses will be to pages other than the active page of that bank. As accesses to pages other than the active page incur a higher access latency than accesses to the active page, this increased frequency of access to non-active pages of the bank introduces a significant average access latency penalty. Moreover, while a frequently accessed bank may be processing accesses to non-active pages, other banks that otherwise could be servicing memory accesses are likely to be idle due to the imbalanced distribution of traffic among the banks of the memory.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-6 illustrate example systems and processes for more evenly distributing memory access traffic among the banks of a dynamic random access memory (DRAM) or other banked memory, which in turn can lead to decreased average memory access latencies. In at least one embodiment, bank remapping logic implements a remapping function that remaps the banks referenced by memory access requests by modifying the bank segments of memory addresses referenced by these memory access requests such that memory access requests are more evenly distributed among the banks, regardless of the original memory allocation scheme. The bank remapping logic may be employed solely in hardware such that the bank remapping process is transparent to the operating system, firmware, or application software of the processing system; that is, the remapping occurs without the involvement of software. The bank remapping logic may be employed in a processing component separate from the banked memory, thereby permitting the use of conventional bank memory. Alternatively, the bank remapping logic may be employed in the banked memory, permitting the use of a conventional processing component coupled to the banked memory.

Figure 1:
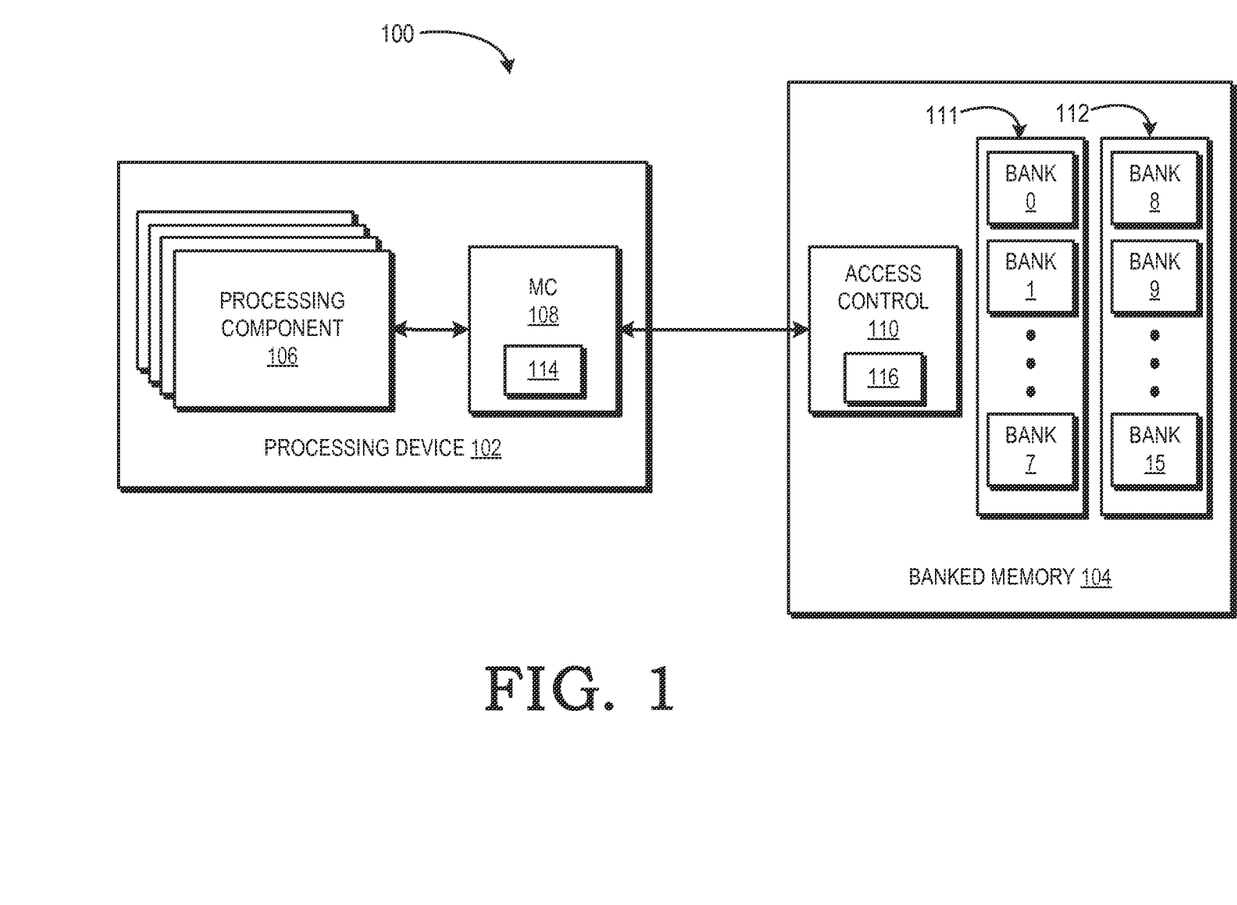
FIG. 1 is a block diagram illustrating a processing system employing distributed memory access traffic for a banked memory in accordance with at least one embodiment of the present disclosure.

FIG. 1 illustrates an example processing system 100 utilizing a bank remapping process for improved distribution of memory accesses among banks of a banked memory in accordance with at least one embodiment of the present disclosure. The processing system 100 includes one or more processing devices 102 coupled to a banked memory 104. The processing device 102 can include, for example, a central processing unit (CPUs), a graphics processing unit (GPU), a digital signal processor (DSP), programmable logic (e.g., field programmable gate arrays or programmable logic arrays), an application specific integrated circuit (ASIC), or a combination thereof The banked memory 104 comprises memory organized into a plurality of banks, such as memories implementing a dynamic random access memory (DRAM) architecture, such as a static DRAM (SDRAM) memory (which may include, for example, double data rate (DDR) or DDR3 DRAM memories). In the depicted example, the processing device 102 includes one or more processing components 106 (e.g., processor cores, input/output interfaces, etc.) and a memory controller (MC) 108. The banked memory 104 includes a plurality of banks organized into one or more ranks, such as two ranks 111, 112 implementing banks 1-7 and 8-15, respectively, as illustrated in the example of FIG. 1. The banked memory 104 further includes access control logic 110 to control access to the memory locations located within each bank.

The processing system 100 further includes bank remapping logic 114, 116 to modify memory access requests generated by the processing component by replacing the original bank segment of the memory address referenced by a memory access request with a modified bank segment. The bank remapping logic implements a remapping function that calculates this modified bank segment based one or more inputs, such as the original bank segment, other segments of the memory address, and the like. The remapping function is designed to more evenly distribute memory access requests issued by the processing device 102 among the banks of the banked memory 104. To this end, the remapping function may be a 1-to-1 function between the original bank segment and the modified bank segment for a given row of memory for a given row. In this manner, the bank remapping logic may implement the bank remapping process without requiring tracking or management assistance from an operating system (OS) or firmware, and thus may perform the bank remapping process using hardcoded hardware in a manner transparent to software executed in the processing system 100.

The bank remapping logic may be implemented at any of a variety of points along the memory access processing path in the processing system 100. In one embodiment, the bank remapping logic may be implemented as bank remapping logic 114 that is part of, or associated with, the memory controller 108. In such instances, for each memory access request received at the memory controller 108, the bank remapping logic 114 modifies the bank segment of the memory address of the memory access request to generate a modified memory access request with the resulting modified memory address, and this modified memory access request is transmitted by the memory controller 108 to the banked memory for servicing by the access control logic 110 like any other memory access request. Under this approach, the banked memory 104 may be implemented as conventional DRAM or other conventional banked memory device. In other embodiments, the bank remapping logic is implemented as bank remapping logic 116 within the banked memory 104. In such instances, for each memory access request received from the memory controller 108, the bank remapping logic 116 remaps the original bank segment of the memory address of the received memory access request to a modified bank segment, which the access control logic 110 then uses to access the corresponding memory location in the bank identified by the modified bank segment. Under this approach, no modification to conventional processing components is required in order to implement the more even distribution of memory accesses among the banks of the memory.

Figure 2:
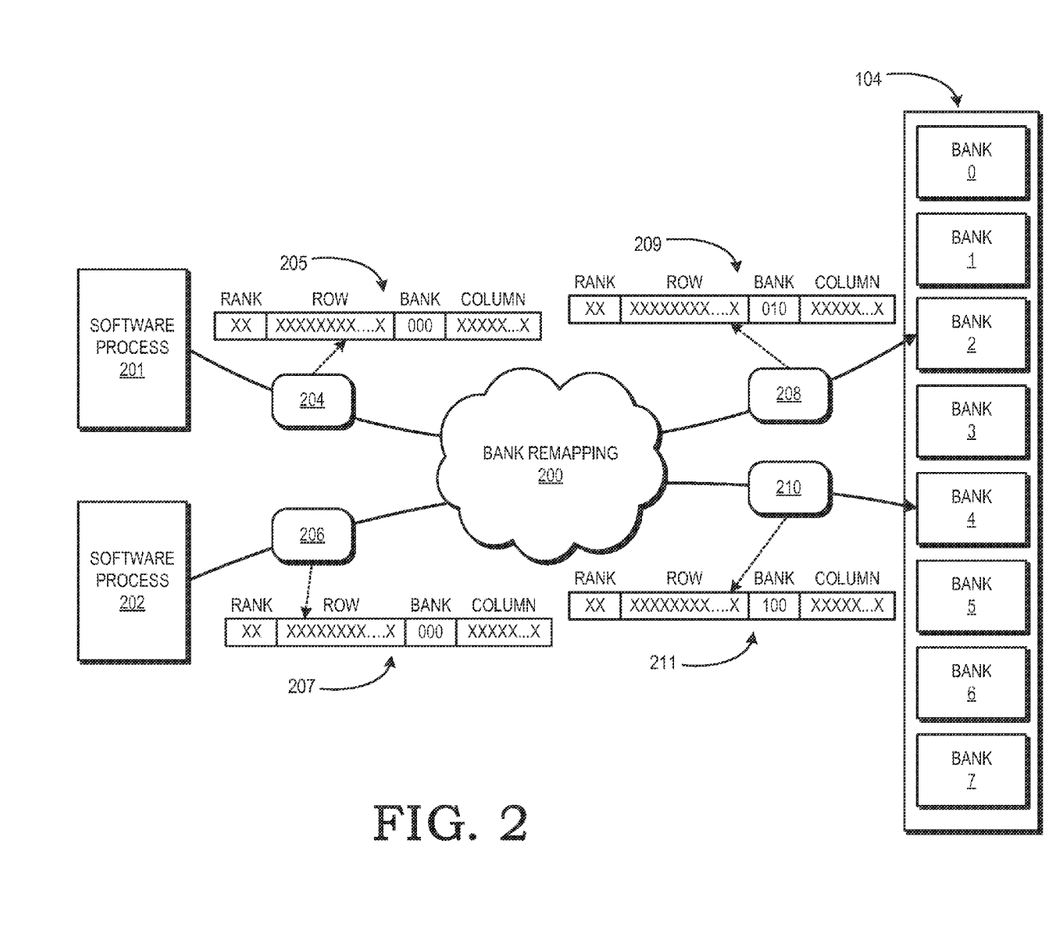
FIG. 2 is a block diagram illustrating a process for distributing memory access traffic among banks of a memory in accordance with at least one embodiment of the present disclosure.

FIG. 2 illustrates an example operation of the bank remapping process implemented by the processing system 100 of FIG. 1. In the depicted example, two software processes 201, 202 (e.g., software applications, threads, etc.) are allocated respective memory address spaces from a free memory heap maintained by an OS or firmware of the processing device 102. The software process 201 issues a memory access request 204 (e.g., a read, write, or modify request) to a memory location associated with original memory address 205. Shortly thereafter, the software process 202 issues a memory access request 206 to a memory location associated with original memory address 207. As depicted, the memory address 205 includes a bank segment that identifies bank 0 as the target bank. Likewise, the memory address 207 includes a bank segment that also identifies bank 0 as the target bank. However, assume in this example that the memory addresses 205 and 207 are targeted to different pages. As such, because both memory access requests 204 and 206 are targeted to the same bank but different pages, the later-processed memory access request 206 will incur a significant access latency penalty due both to bank 0 being otherwise occupied with the processing of memory access request 204, and to memory access request 206 being directed to the non-active page of bank 0.

To address this scenario, bank remapping logic 200 (representing either bank remapping logic 114 or bank remapping logic 116 of FIG. 1) remaps the banks addressed by these memory access requests to more evenly distribute the memory accesses among the banks 0-7. Thus, in response to receiving the memory access request 204, bank remapping logic 200 (representing either bank remapping logic 114 or bank remapping logic 116 of FIG. 1) calculates a modified bank segment using a remapping function that provides 1-to-1 correspondence between the original bank segment and the modified bank segment so as to provide collisions between memory accesses with different original memory addresses. The remapping function may have one or more inputs based on the memory access request, such as the one or more segments of the original memory address, the source of the memory access request, and the like. To illustrate, the remapping function may take the original bank segment as input, may take as inputs the rank segment and the row segment of the original memory address, and the like.

In the example of FIG. 2, the bank segment of the memory address is implemented as a three-bit value, and thus the remapping function may be implemented in hardware logic as an XOR reduction of various bits from the row segment (ROW[15:0]) and original bank segment (BANK[2:0]) to determine the modified bank segment (MOD_BANK[2:0]). For example, MOD_BANK[2:0] may be calculated using hardware logic gates and buffers thusly:

$$MOD\_BANK[2] = \hat{}ROW[5:2]\hat{}BANK[2]$$

$$MOD\_BANK[1] = \hat{}ROW[4:1]\hat{}BANK[1]$$

$$MOD\_BANK[0] = \hat{}ROW[3:0]\hat{}BANK[0]$$

In the depicted example, the bank remapping logic 200 calculates a modified bank segment of "010", which identifies bank 2 of the banked memory 104. The bank remapping logic 200 then substitutes the modified bank segment for the original bank segment, thereby generating a modified memory access request 208 having a modified memory address 209 with the modified bank segment "010" in place of the original bank segment "000." Similarly, in the depicted example, in response to receiving the memory access request 206, the bank remapping logic 200 calculates a modified bank segment of "100," which identifies bank 4 of the banked memory 104. The bank remapping logic 200 then substitutes the modified bank segment for the original bank segment, thereby generating a modified memory access request 210 having a modified memory address 211 with the modified bank segment "100" in place of the original bank segment "000."

Thus, as illustrated by the example of FIG. 2, the bank remapping logic 200 remaps the banks referenced by the memory access requests 204, 206 such that the memory access requests transition from being targeted to the same bank to being targeted to different banks, thereby allowing two separate banks to independently process a corresponding one of the two memory access requests in parallel, as well as increasing the likelihood that one of the memory access requests will be targeted to the currently active page of the corresponding bank. It should be noted that although the example of FIG. 2 shows that the each memory access request is remapped to a different bank than original specified in the memory access request, depending on the remapping function and its inputs, it will be appreciated that the "remapped" bank may end up being the same bank as originally addressed in the memory access request.

Figure 3:
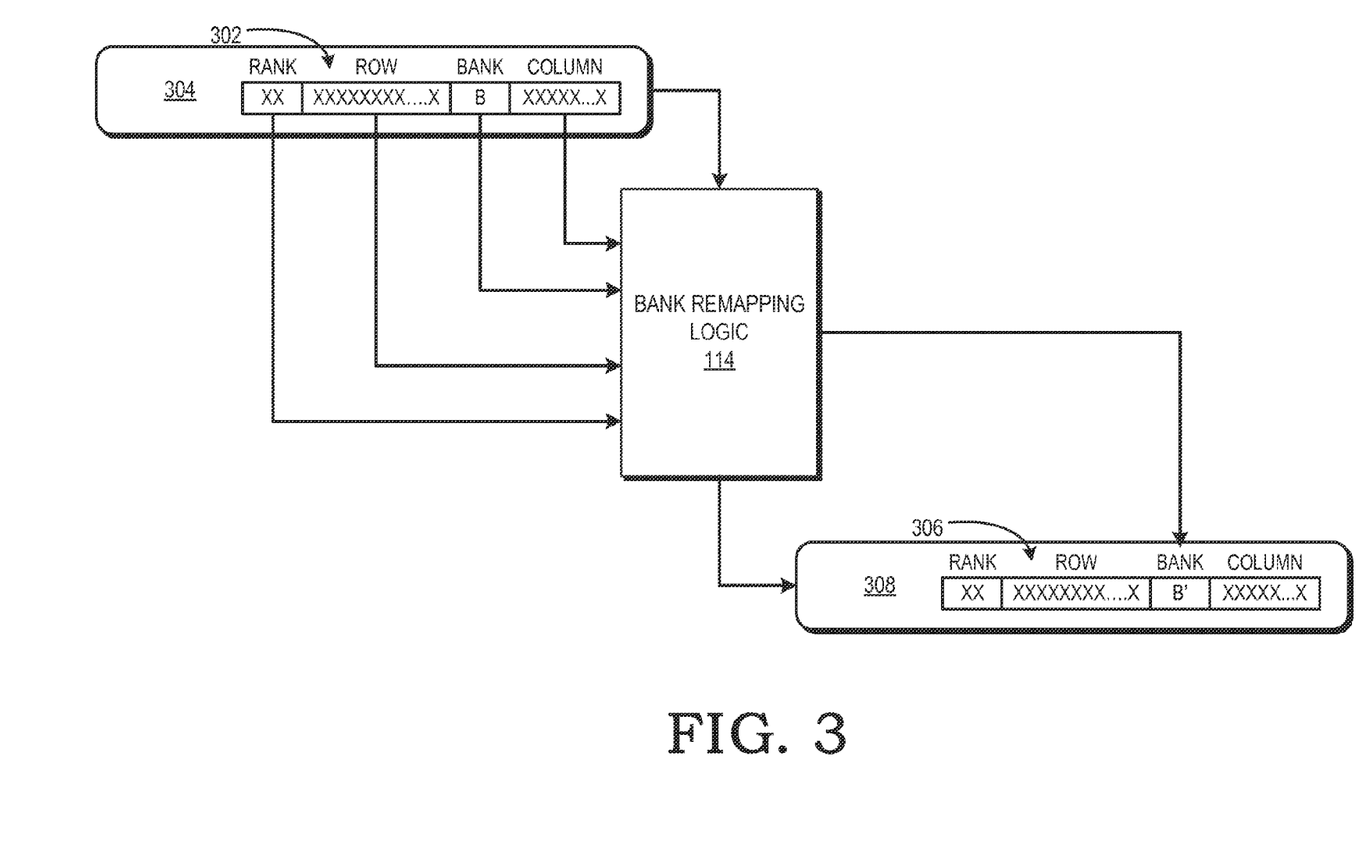
FIG. 3 is a block diagram illustrating bank remapping logic of a memory controller of the processing system of FIG. 1 in accordance with at least one embodiment of the present disclosure.
Figure 4:
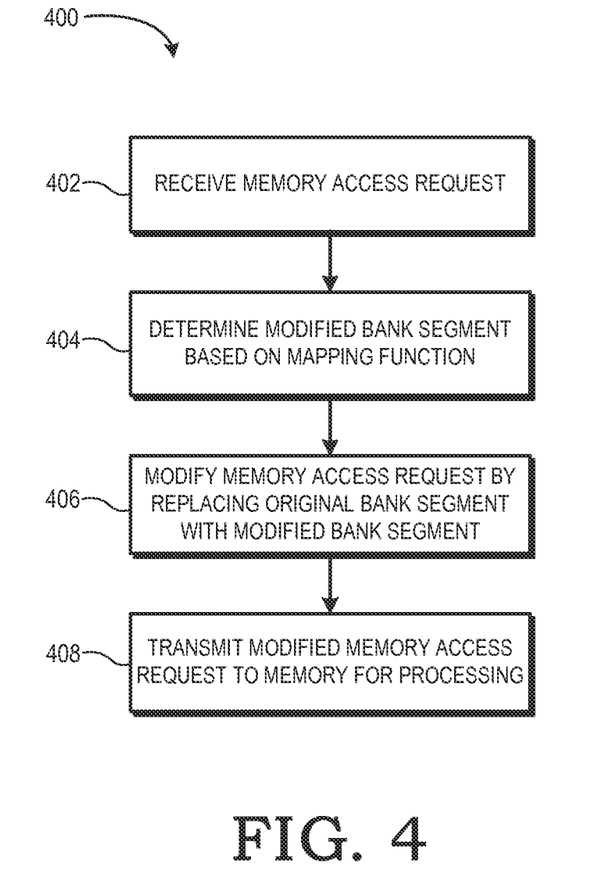
FIG. 4 is a flow diagram illustrating method of operation of the bank remapping logic of FIG. 3 in accordance with at least one embodiment of the present disclosure.

FIG. 3 illustrates an example of the bank remapping logic 114 implemented in association with the memory controller 108 and FIG. 4 illustrates an example method 400 of operation of the illustrated implementation of the bank remapping logic 114 in accordance with at least one embodiment of the present disclosure. As depicted, the bank remapping logic 114 includes inputs to receive one or more segments of a memory address 302 of an original memory access request 304 issued by a software process of the processing device 102 (FIG. 1) and an output to provide a modified bank segment that replaces the original bank segment of the memory address 302, thereby forming a modified memory address 306 of a modified memory access request 308.

Method 400 illustrates an example operation of the bank remapping logic 114. The method 400 initiates at block 402 with the receipt of the original memory access request 304 at the memory controller 108. At block 404, the bank remapping logic 114 calculates a modified block segment based on one or more inputs, such as one or more of the rank, row, column, and bank segments of the original memory address 306 of the memory access request. At block 406, the bank remapping logic 114 replaces the original bank segment with the modified bank segment, thereby generating the modified memory address 306 of the modified memory access request 308. To illustrate, the original memory address 302 may be stored in a register or other buffer at the memory controller 108, and the bank remapping logic 114 comprises hardcoded logic that has inputs connected to corresponding bit positions of the register that constitute the input segments, and outputs to the bit positions of the register that constitute the bank segment, and from the appropriate input bits the hardcoded logic calculates the modified bank segment and overwrites the bit positions of the register that correspond to the original bank segment with the bits corresponding to the calculated modified bank segment. At block 408, the memory controller 108 transmits the modified memory access request 308 to the banked memory 104, which in turn performs the requested memory access using the modified memory address 306 (and thus to a bank identified by the modified bank segment). In this manner, the bank remapping process is performed at the memory controller 108 without input or oversight by an OS, application, or firmware. Likewise, because the memory controller 108 handles the bank remapping, the bank remapping process likewise is transparent to the banked memory 104, and thus does not require modification of a conventional design for the banked memory 104.

Figure 5:
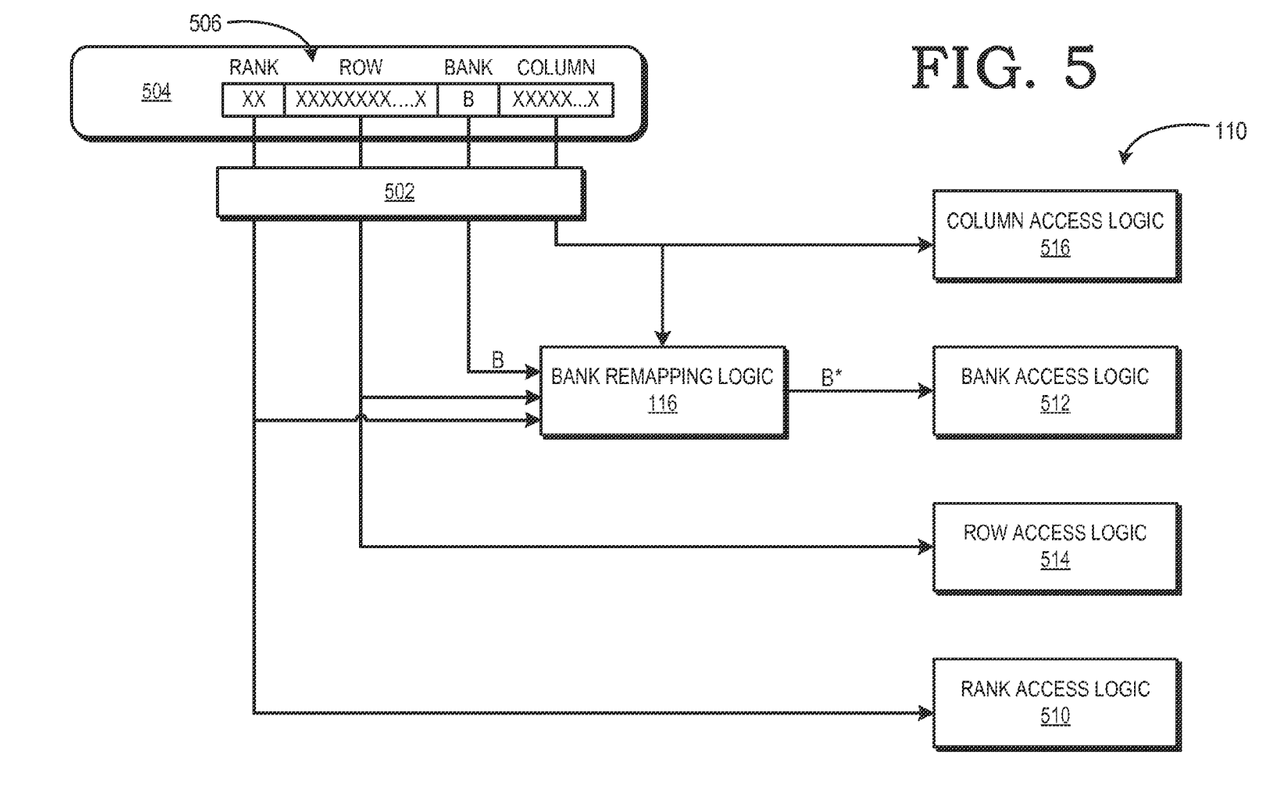
FIG. 5 is a block diagram illustrating bank remapping logic and access control logic of a banked memory device of the processing system of FIG. 1 in accordance with at least one embodiment of the present disclosure.
Figure 6:
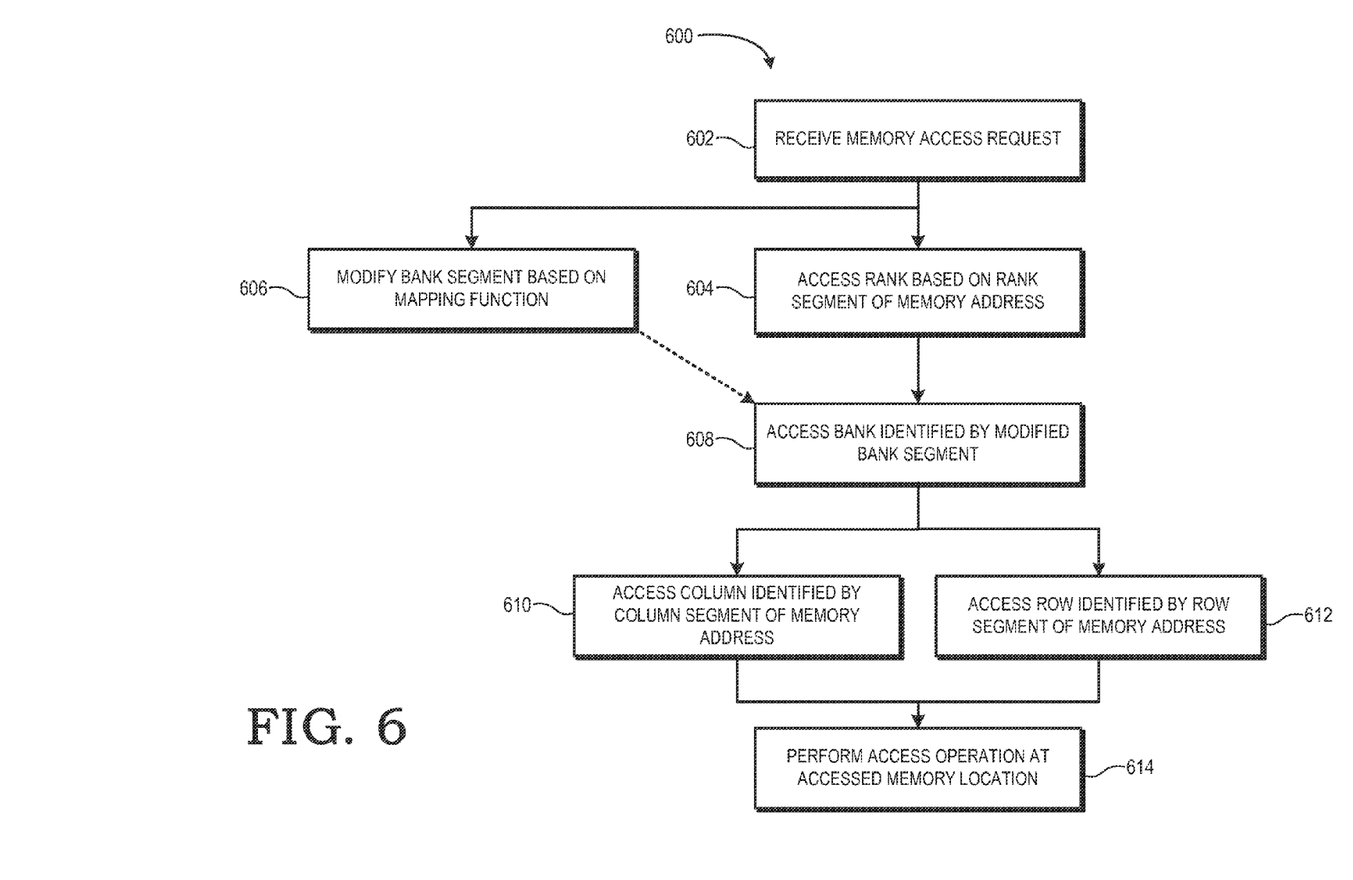
FIG. 6 is a flow diagram illustrating method of operation of the bank remapping logic and access control logic of FIG. 5 in accordance with at least one embodiment of the present disclosure.

FIG. 5 illustrates an example of the bank remapping logic 116 implemented at the banked memory 104 and FIG. 6 illustrates an example method 600 of operation of the illustrated implementation of the bank remapping logic 116 in accordance with at least one embodiment of the present disclosure. The banked memory 104 includes an interface 502, the access control logic 110, and the bank remapping logic 116. The interface 502 is to receive a memory access request 504 from the memory controller 108, whereby the memory access request 504 has an original memory address 506. The access control logic 110 includes various logic portions to access corresponding aspects of the banked memory 104, such as rank access logic 510 to access a rank identified by the rank segment of the original memory address 506, bank access logic 512 to access an identified bank of the accessed rank, row access logic 514 to access a row within the accessed bank, the accessed row identified by the row segment of the original memory address 506, and column access logic 516 to access a column within the accessed row, the accessed column identified by the column segment of the original memory address 506.

The bank remapping logic 116 is positioned between the interface 502 and the input of the bank access logic 512, whereby the bank remapping logic 116 accesses the original bank segment ("B") of the original memory address 506, calculates a modified bank segment ("B*") using a 1-to-1 function, and provides the modified bank segment B* to the input of the bank access logic 512, which accesses the bank identified by the modified bank segment B*.

Method 600 illustrates an example operation of the implementation of FIG. 5. The method 600 initiates at block 602 with the receipt of the memory access request 504 at the interface 502 of the banked memory 104. At block 604, the rank access logic 510 uses the rank segment of the memory address 506 of the received memory access request 504 to initiate access to the rank identified by the rank segment. Concurrently, at block 606 the bank remapping logic 116 uses a 1-to-1 function to calculates a modified bank segment using one or more segments of the memory address 506 (and/or other inputs). In the illustrated example, the remapping function uses at least the original bank segment B to calculate the modified bank segment B*. The bank remapping logic 116 then supplies this modified bank segment B* to the bank access logic 512, which at block 608 initiates access to the bank identified by the modified bank segment B* within the rank accessed at block 604. At block 610 the column access logic 516 initiates access the column of the accessed bank that is identified by the column segment of the memory address 506 and at block 612 the row access logic 514 initiates access to the column of the accessed bank that is identified by the row segment of the memory address 506, thereby providing access to a memory location corresponding to the original memory address 506 after modification of the bank segment. At block 614 the banked memory 104 performs the access operation (e.g., read operation, write operation, modify operation, etc.) requested by the memory access request 504 to the accessed memory location.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A system comprising:
    a processing component; and
    a memory controller coupled to the processing component and coupleable to a memory having a plurality of banks, the memory controller to conduct memory accesses to the memory responsive to memory access requests from the processing component, and wherein the memory controller is to distribute memory accesses among the plurality of banks by modifying, for each memory access request, a bank of the memory referenced by the memory access request by determining a modified bank segment for replacing an original bank segment of a memory address associated with the memory access request using a one-to-one function that calculates the modified bank segment using each of a plurality of bits of a row segment of the memory address, at least one bit of the original bank segment, and a rank segment of the memory address.

2. The system of claim 1, further comprising:
    the memory coupled to the memory controller.

3. The system of claim 2, wherein the memory comprises synchronous dynamic random access memory (SDRAM).

4. The system of claim 1, wherein the one-to-one function calculates the modified bank segment based on an XOR reduction of the plurality of bits of the row segment, the at least one bit of the original bank segment, and the rank segment.

5. A memory device comprising:
    a plurality of banks;
    an interface to receive memory access requests;
    bank remapping logic coupled to the interface, the bank remapping logic to, for each received memory access request, remap a bank segment of a memory address associated with the received memory access request by determining a modified bank segment to replace an original bank segment of a memory address associated with the memory access request using a one-to-one function that calculates the modified bank segment using each of a plurality of bits of a row segment of the memory address, at least one bit of the original bank segment, and a rank segment of the memory address; and
    access control logic coupled to the plurality of banks and the bank remapping logic, the access control logic to, for each received memory access request, access a bank of the plurality of banks based on the modified bank segment for the memory access request.

6. The memory device of claim 5, wherein the memory device comprises synchronous dynamic random access memory (SDRAM).

7. The memory device of claim 5, wherein the one-to-one function calculates the modified bank segment based on an XOR reduction of the plurality of bits of the row segment, the at least one bit of the original bank segment, and the rank segment.

8. In a processing system comprising a memory having a plurality of banks, a method comprising:
    receiving a memory access request having a first memory address with a first bank segment and a first row segment;
    generating a second bank segment based on the first memory address using a one-to-one remapping function that calculates the second bank segment using a plurality of bits of the first row segment of the first memory address, at least one bit of the first bank segment, and a rank segment of the memory address; and
    conducting, for the memory access request, a memory access to a bank of the plurality of banks based on the second bank segment.

9. The method of claim 8, wherein:
    receiving the memory access request comprises receiving the memory access request at a memory controller of the processing system; and
    generating the second bank segment based on the memory access comprises generating the second bank segment at the memory controller coupled to the memory.

10. The method of claim 9, further comprising:
    generating, at the memory controller, a second memory address by replacing the first bank segment with the second bank segment in the first memory address; and
    wherein conducting the memory access comprises conducting the memory access request using the second memory address.

11. The method of claim 8, wherein:
    receiving the memory access request comprises receiving the memory access request at the memory; and
    generating the second bank segment based on the memory access comprises generating the second bank segment at the memory.

12. The method of claim 11, wherein the one-to-one remapping function calculates the second bank segment further based on a rank segment of the first memory address.

13. The method of claim 8, wherein generating the second bank segment comprises generating the second bank segment without software involvement.

14. The method of claim 8, wherein the one-to-one remapping function calculates the second bank segment based on an XOR reduction of the plurality of bits of the first row segment, the at least one bit of the original bank segment, and the rank segment.

* * * * *